United States Patent [19]

Anderson et al.

[11] Patent Number: 5,175,476
[45] Date of Patent: Dec. 29, 1992

[54] MAGNETICALLY TUNABLE STARTING CIRCUIT FOR AN ELECTRODELESS HIGH INTENSITY DISCHARGE LAMP

[75] Inventors: John M. Anderson, Scotia; George A. Farrall, Rexford; John P. Cocoma, Clifton Park; Victor D. Roberts, Burnt Hills, all of N.Y.

[73] Assignee: General Electric Company, Schenectady, N.Y.

[21] Appl. No.: 868,902

[22] Filed: Apr. 16, 1992

[51] Int. Cl.$^5$ .................................... H05B 41/16
[52] U.S. Cl. ................................ 315/248; 315/344
[58] Field of Search ............... 315/248, 39, 344, 267; 313/234, 607

[56] References Cited

U.S. PATENT DOCUMENTS

| | | | |
|---|---|---|---|
| 4,810,938 | 3/1989 | Johnson et al. | 315/248 |
| 4,812,702 | 3/1989 | Anderson | 313/153 |
| 4,972,120 | 11/1990 | Witting | 313/638 |
| 5,039,903 | 8/1991 | Farrall | 313/160 |
| 5,047,692 | 9/1991 | Borowiec et al. | 315/248 |
| 5,057,750 | 10/1991 | Farrall | 315/344 |
| 5,059,868 | 10/1991 | El-Hamamsy et al. | 315/248 |
| 5,095,249 | 3/1992 | Roberts et al. | 315/248 |
| 5,103,140 | 4/1992 | Cocoma | 315/248 |
| 5,118,996 | 6/1992 | El-Hamamsy | 315/248 |

Primary Examiner—Eugene R. LaRoche
Assistant Examiner—A. Zarabian
Attorney, Agent, or Firm—Jill M. Breedlove; Marvin Snyder

[57] ABSTRACT

A series resonant starting circuit for providing a starting voltage to a starting probe for initiating an arc discharge in an electrodeless HID lamp includes an electrically variable inductance. The HID lamp is of a type having an excitation coil situated around an arc tube containing an ionizable fill in which the arc discharge is ignited. The electrically variable inductance includes a magnetic core having a main winding wound thereon that is coupled in series with a resonant capacitance. A bias winding is also wound on the magnetic core. Either the bias winding is coupled in series with a bias inductor, or, alternatively, the main and bias windings are configured on the magnetic core as a cross-field inductor. A bias circuit supply provides dc or relatively low-frequency ac current to the bias winding in order to vary the permeability of the magnetic core, and hence the inductance of the main winding, thereby tuning the starting circuit.

9 Claims, 3 Drawing Sheets

MAGNETICALLY TUNABLE STARTING CIRCUIT FOR AN ELECTRODELESS HIGH INTENSITY DISCHARGE LAMP

FIELD OF THE INVENTION

The present invention relates generally to starting aids for electrodeless high intensity discharge lamps and, more particularly, to a magnetically tunable starting circuit therefor.

BACKGROUND OF THE INVENTION

In a high intensity discharge (HID) lamp, a medium to high pressure ionizable gas, such as mercury or sodium vapor, emits visible radiation upon excitation typically caused by passage of current through the gas. One class of HID lamps comprises electrodeless lamps which generate an arc discharge by generating a solenoidal electric field in a high-pressure gaseous lamp fill. In particular, the lamp fill, or discharge plasma, is excited by radio frequency (RF) current in an excitation coil surrounding an arc tube. The arc tube and excitation coil assembly acts essentially as a transformer which couples RF energy to the plasma. That is, the excitation coil acts as a primary coil, and the plasma functions as a single-turn secondary. RF current in the excitation coil produces a time-varying magnetic field, in turn creating an electric field in the plasma which closes completely upon itself, i.e., a solenoidal electric field. Current flows as a result of this electric field, resulting in a toroidal arc discharge in the arc tube.

At room temperature, the solenoidal electric field produced by the excitation coil is typically not high enough to ionize the gaseous fill and thus initiate the arc discharge. Hence, an auxiliary starting circuit is generally required to initiate the arc discharge in an electrodeless HID lamp. One type of starting circuit employs a resonant inductance and capacitance to develop a high voltage from stray flux of the main excitation coil. This high voltage is communicated to the arc tube via, for example, a gas-filled probe appended to the arc tube in the manner described by commonly assigned U.S. Pat. No. 5,095,249 of Roberts et al., issued Mar. 10, 1992, which is incorporated by reference herein.

Typically, the starting circuit which generates the high voltage is tuned to resonance by mechanically varying a capacitor. On the other hand, variable inductors may be used, but variable inductors having precise, tunable reactances are relatively difficult to construct. In any event, for some applications, it is desirable that such a resonant circuit have electrical and/or magnetic tuning capability rather than, or in addition to, mechanical tuning capability.

SUMMARY OF THE INVENTION

A series resonant starting circuit for providing a starting voltage to a starting probe for initiating an arc discharge in an electrodeless HID lamp includes an electrically variable inductance. The HID lamp is of a type having an excitation coil situated around an arc tube containing an ionizable fill in which the arc discharge is ignited. The electrically variable inductance comprises a magnetic core having a main winding wound thereon that is coupled in series with a resonant capacitance, which may simply comprise the parasitic capacitance between the starting probe and the excitation coil. A bias winding is also wound on the magnetic core. Bias circuit supply means supplies dc or relatively low-frequency ac current to the bias winding in order to vary the permeability of the magnetic core, and hence the inductance of the main winding, thereby tuning the starting circuit. Furthermore, in order to decouple the bias winding supply from the ballast circuit, either the main and bias windings are configured on the magnetic core as a cross-field inductor, or a bias inductor is placed between the bias winding and the bias circuit supply means to provide a relatively high impedance at the operating frequency of the starting circuit.

BRIEF DESCRIPTION OF THE DRAWINGS

The features and advantages of the present invention will become apparent from the following detailed description of the invention when read with the accompanying drawings in which.

DETAILED DESCRIPTION OF THE INVENTION

Figure 1:
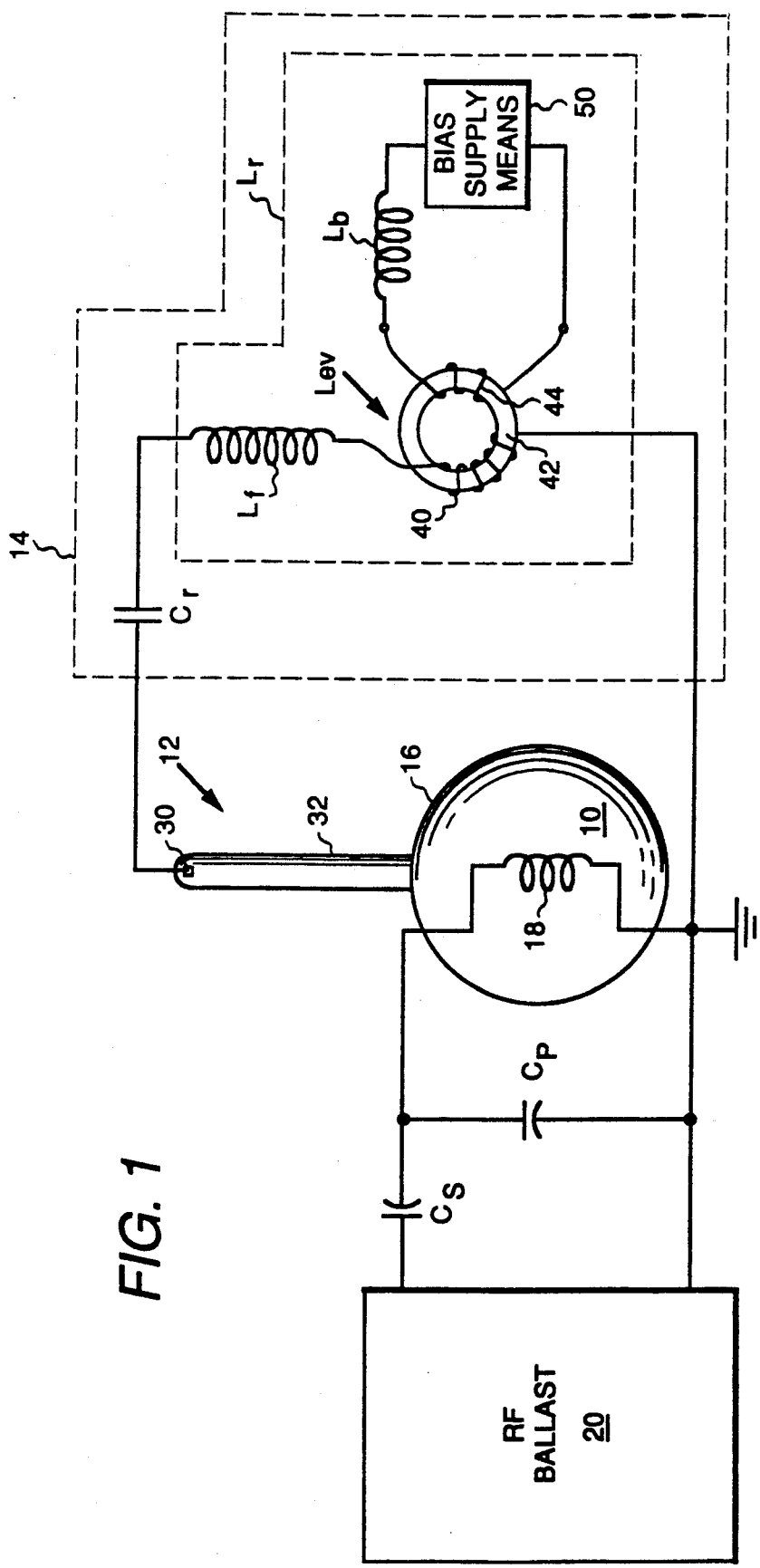
FIG. 1 schematically illustrates an electrodeless HID lamp system employing a resonant starting circuit including an electrically variable inductance according to the present invention.

FIG. 1 illustrates an HID lamp system, including an electrodeless HID lamp 10 employing a starting probe 12 coupled to a starting circuit 14 according to the present invention. Lamp 10 includes a light-transmissive arc tube 16 preferably formed of a high temperature glass, such as fused quartz, or an optically translucent ceramic, such as polycrystalline alumina. An excitation coil 18 surrounds arc tube 16 and is coupled to a radio frequency (RF) ballast 20 for exciting an arc discharge in a fill contained within the arc tube. For clarity of illustration, however, excitation coil 18 is not shown in its operational position about arc tube 16, but is shown only schematically in FIG. 1.

A suitable arc tube fill, described in U.S. Pat. No. 4,810,938 of P. D. Johnson, J. T. Dakin and J. M. Anderson, issued on Mar. 7, 1989 and assigned to the present assignee, comprises a sodium halide, a cerium halide and xenon combined in weight proportions to generate visible radiation exhibiting high efficacy and good color rendering capability at white color temperatures. For example, such a fill according to the Johnson et al. patent may comprise sodium iodide and cerium chloride, in equal weight proportions, in combination with xenon at a partial pressure of about 500 torr. The Johnson et al. patent is incorporated by reference herein. Another suitable fill is described in commonly assigned U.S. Pat. No. 4,972,120 of H. L. Witting issued Nov. 20, 1990, which patent is incorporated by reference herein. The fill of the Witting patent comprises a combination of a lanthanum halide, a sodium halide, a cerium halide and xenon or krypton as a buffer gas; for example, a fill according to the Witting patent may comprise a combination of lanthanum iodide, sodium iodide, cerium iodide, and 250 torr partial pressure of xenon.

An exemplary excitation coil 18 is described in commonly assigned U.S. Pat. No. 5,039,903 of G. A. Farrall, issued Aug. 13, 1991 and incorporated by reference herein. The overall shape of the excitation coil of the Farrall patent is generally that of a surface formed by rotating a bilaterally symmetrical trapezoid about a coil center line situated in the same plane as the trapezoid, but which line does not intersect the trapezoid. However, other suitable coil configurations may be used with the starting aid of the present invention, such as that described in commonly assigned U.S. Pat. No. 4,812,702 of J. M. Anderson, issued Mar. 14, 1989, which patent is incorporated by reference herein. In particular, the Anderson patent describes a coil having six turns which are arranged to have a substantially V-shaped cross section on each side of a coil center line. Still another suitable excitation coil may be of solenoidal shape, for example.

RF ballast 20 may comprise, for example, a Class-D power amplifier, such as the ballast described in commonly assigned U.S. Pat. No. 5,047,692 of J. C. Borowiec and S. A. El-Hamamsy, issued Sep. 10, 1991, which is incorporated by reference herein. The Class-D ballast includes two switching devices connected in series with a dc power supply in a half-bridge configuration. In operation, the switching devices are driven alternately between cutoff and saturation such that one is conducting while the other one is turned off and vice versa. Hence, the Class-D ballast may be conveniently driven by a square wave signal.

As illustrated in FIG. 1, a resonant load network is coupled to the output of ballast 20. The resonant load network comprises the excitation coil 18 of HID lamp 10 and a tuning capacitor $C_P$ connected in parallel therewith. The parallel combination of capacitor $C_P$ and coil 18 functions as an impedance transformer to reflect the impedance of the arc discharge into the ballast load. A blocking/tuning capacitor $C_s$ is connected in series with the parallel combination of coil 16 and capacitor $C_P$. In particular, capacitor $C_s$ is used both for blocking dc voltage and for resonant circuit tuning. As described in U.S. Pat. No. 5,047,692, cited hereinabove, capacitors $C_s$ and $C_P$ are chosen to ensure impedance matching for maximum efficiency.

By way of example, starting probe 12 is illustrated in FIG. 1 as comprising a gas probe starter, such as that described in Roberts et al. U.S. Pat. No. 5,095,249, cited hereinabove. Gas probe starter 12 comprises a starting electrode 30 coupled to a starting chamber 32 which is attached to the outer wall of arc tube 16 and contains a gas. The gas in starting chamber 32 may comprise, for example, a rare gas at a pressure in the range from approximately 0.5 to 500 torr, with a preferred range being from approximately 5 to 40 torr. Preferably, the gas in chamber 32 is at a low pressure relative to that of the arc tube fill in order to promote even easier starting. In an exemplary HID lamp system, a suitable arc tube fill pressure may be approximately 200 torr while that of the gas in starting chamber 32 may be approximately 20 torr.

Although the starting circuit of the present invention is described herein specifically with reference to use with a gas probe starter, it is to be understood that the starting circuit of the present invention may be used with other suitable types of starting aids, such as, for example, that described in commonly assigned U.S. Pat. No. 5,059,868 of S. A. El-Hamamsy and R. J. Thomas, which is incorporated by reference herein.

Starting circuit 14 comprises a series resonant LC circuit including a resonant inductance $L_r$ coupled in series with a resonant capacitance $C_r$, which may simply comprise the parasitic capacitance between starting probe 12 and excitation coil 18. In accordance with the present invention, resonant inductance $L_r$ includes an electrically variable inductance $L_{ev}$. Additionally, according to a preferred embodiment, electrically variable inductance $L_{ev}$ is coupled in series with a fixed inductor $L_f$ having a relatively high quality factor Q in order to minimize core losses.

Electrically variable inductance $L_{ev}$ comprises a main winding 40 wound about a magnetic core 42. A bias winding 44 is also wound about magnetic core 42. According to the embodiment of FIG. 1, bias winding 44 is coupled in series with a bias inductor $L_b$ in order to provide a relatively high input impedance at the operating frequency of the starting circuit. Bias winding 44 and inductor $L_b$ are coupled in series with a bias circuit supply means 50.

In operation, an RF signal is applied to excitation coil 18 via ballast 20, and bias circuit supply means 50 supplies a dc or relatively low frequency ac current to bias winding 44 via bias inductor $L_b$. As a result, a bias field is generated in bias winding 44 which changes the permeability of magnetic core 42 with respect to the RF field generated by main winding 40. In this way, electrically variable inductance $L_{ev}$ is tuned such that when the RF signal is applied to excitation coil 18 via ballast 20, resonant operation of LC starting circuit 14 results in the application of a sufficiently high starting voltage to starting electrode 30 to ignite a glow discharge, i.e. a relatively low discharge current, in chamber 32. In turn, the starting voltage is capacitively coupled to arc tube 16, thereby ionizing the arc tube fill and initiating an arc discharge therein.

Advantageously, bias inductor $L_b$ provides a high impedance and results in low losses at the operating frequency of the starting circuit and furthermore maintains bias current in bias winding 44 without saturating the bias inductor $L_b$. In addition, mechanical tuning of the resonant starting circuit elements is avoided while optimized starting performance is achieved.

Figure 2:
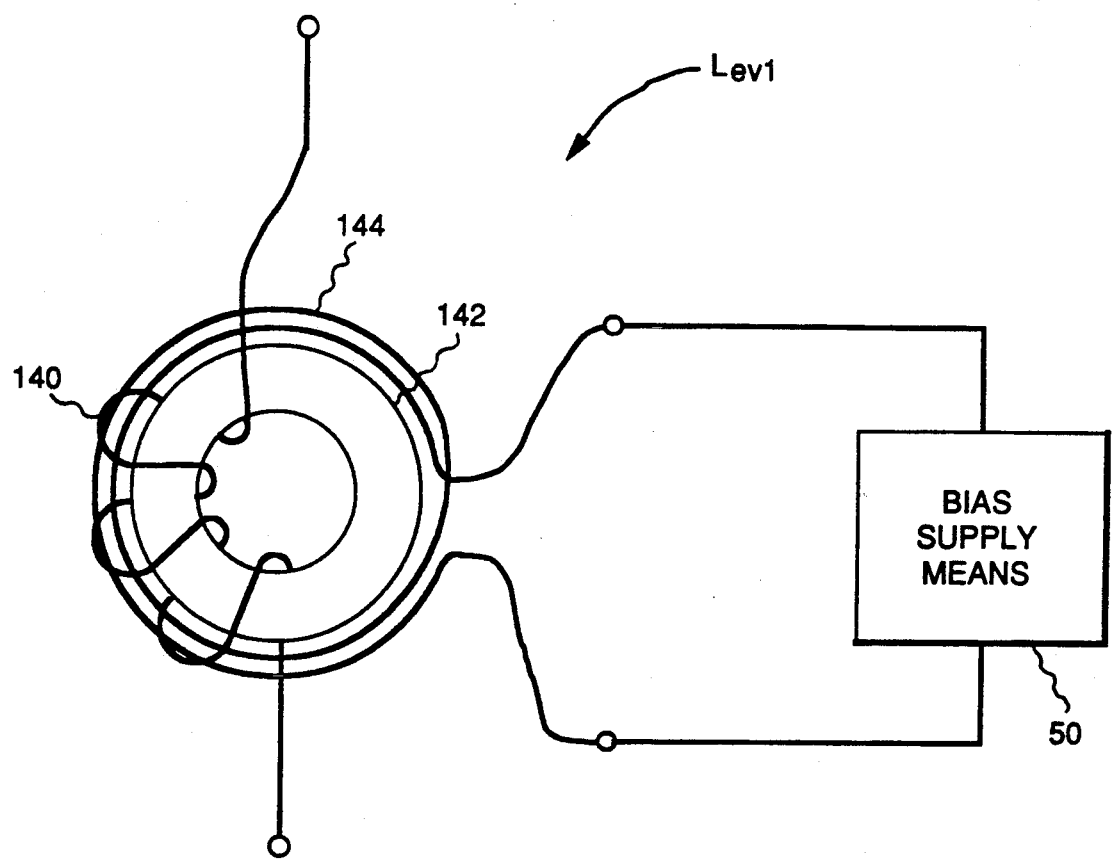
FIG. 2 schematically illustrates an alternative embodiment of an electrically variable inductance suitable for use in the lamp system of FIG. 1.

In an alternative embodiment, as shown in FIG. 2, an electrically variable inductance $L_{ev}$ suitable for use in the lamp system of FIG. 1 comprises a cross-field inductor of a well-known type in which a main winding 140 and a bias winding 144 are wound perpendicular to each other about a toroidal magnetic core 142. In the particular embodiment of FIG. 2, bias winding 144 is wound about the circumference of toroidal core 142 such that main winding 140 is substantially perpendicular thereto. As a result, the magnetic fields generated in the magnetic core 142 by the ballast 20 and bias circuit supply means 50, respectively, are perpendicular to each other so that the RF current in main winding 140 does not induce a voltage across bias winding 144. Hence, the bias winding circuit for tuning the variable inductance is effectively decoupled from the RF ballast circuit.

Figure 3:
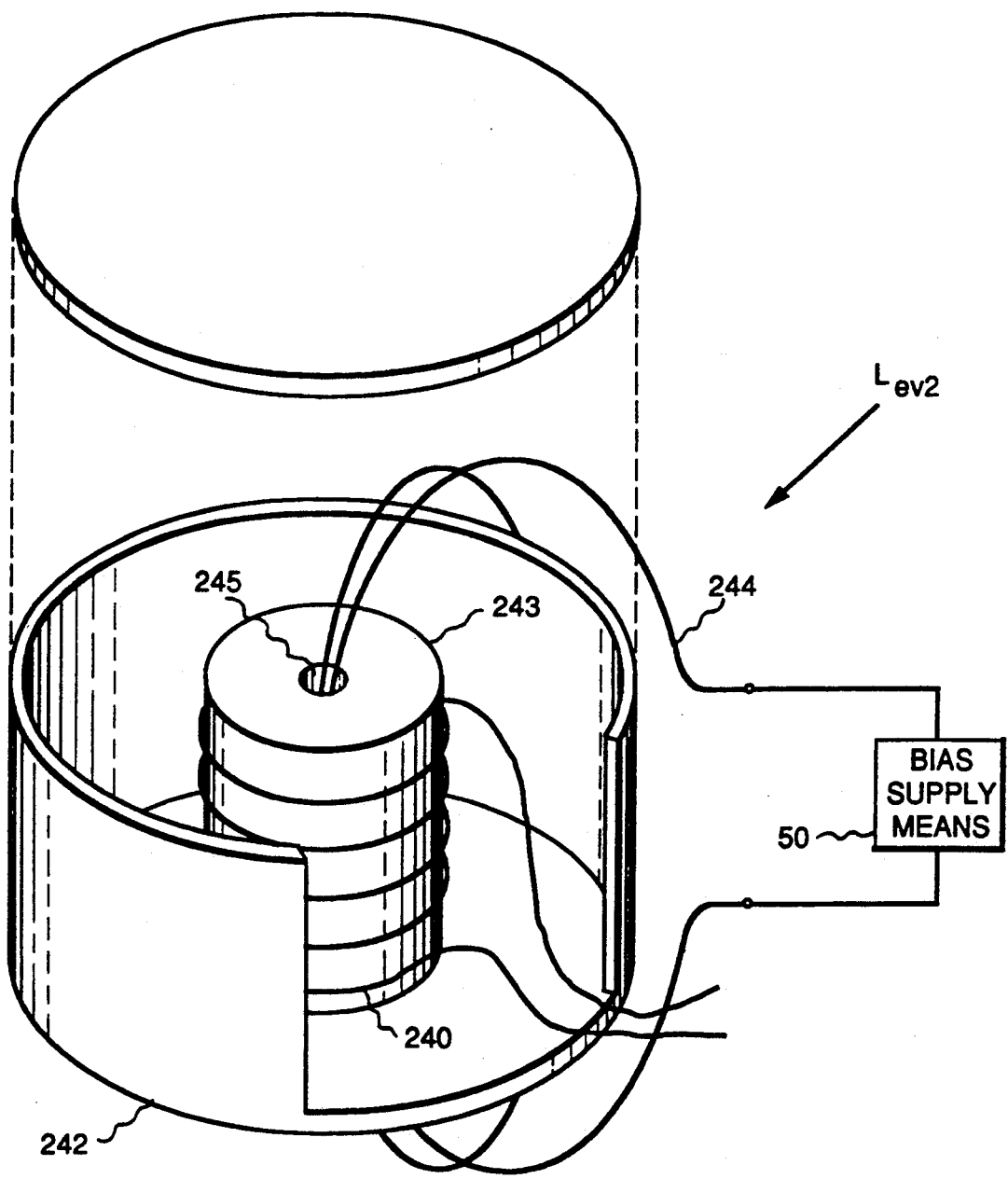
FIG. 3 is another alternative embodiment of an electrically variable inductance suitable for use in the lamp system of FIG. 1.

FIG. 3 illustrates an alternative embodiment of a cross-field inductor $L_{ev2}$ suitable for use in the resonant starting circuit of the present invention. Cross-field inductor $L_{ev2}$ includes a pot core 242 having a center post 243 with an aperture 245 therein. Main winding 240 is wound about the center post. Bias winding 244 is wound about pot core 242 such that it passes through aperture 245 and around the outer wall of pot core 242. Main winding 240 and bias winding 244 are thus substantially perpendicular to each other.

While the preferred embodiments of the present invention have been shown and described herein, it will be obvious that such embodiments are provided by way of example only. Numerous variations, changes and substitutions will occur to those of skill in the art without departing from the invention herein. Accordingly, it is intended that the invention be limited only by the spirit and scope of the appended claims.

What is claimed is:

1. A starting circuit for an electrodeless high intensity discharge lamp of the type having an excitation coil situated about an arc tube for exciting an arc discharge in an ionizable fill contained in said arc tube, comprising:

a starting probe disposed proximate to said arc tube and establishing a parasitic capacitance between said excitation coil and said starting probe;

a series resonant circuit for receiving a radio frequency signal from a radio frequency power supply and providing a resonant starting voltage to said starting probe of sufficient magnitude to initiate the arc discharge in said arc tube, said series resonant circuit including a resonant inductance coupled in series with a resonant capacitance, said resonant capacitance comprising said parasitic capacitance, said resonant inductance comprising an electrically variable inductance;

said electrically variable inductance comprising a magnetic core of variable permeability having a main winding wound thereon coupled in series with said resonant capacitance, said magnetic core further having a bias winding wound thereon and being coupled to a bias circuit supply means for supplying bias current to said bias winding in order to vary said resonant inductance and thereby tune said starting circuit.

2. The starting circuit of claim 1 wherein said bias circuit supply means further comprises a bias inductor coupled in series with said bias winding in order to provide a relatively high impedance between said bias circuit supply means and said bias winding.

3. The starting circuit of claim 1 wherein said electrically variable inductance comprises a cross-field inductor.

4. The starting circuit of claim 3 wherein said magnetic core is toroidal, said bias winding being wound about the circumference of said core such that bias winding and said main winding are substantially perpendicular to each other.

5. The starting circuit of claim 3 wherein said magnetic core comprises a pot core including a center post with an aperture therein, said main winding being wound about said center post and said bias winding being wound through said aperture in said center post such that said bias winding and said main winding are substantially perpendicular to each other.

6. The starting circuit of claim 1 wherein said resonant inductance further comprises a fixed inductor coupled in series with said electrically variable inductance.

7. The starting circuit of claim 1 wherein said bias current is dc.

8. The starting circuit of claim 1 wherein said bias current is relatively low-frequency ac.

9. The starting circuit of claim 1 wherein said starting probe comprises a gas probe starter including:

a starting chamber having a wall enclosing an interior containing a gas, said chamber being attached to the outer wall of said arc tube; and a starting electrode for coupling said starting voltage to the interior of said starting chamber so as to initiate a glow discharge in said starting chamber which is capacitively coupled to the fill in said arc tube.

* * * * *